United States Patent
Sagawa

(10) Patent No.: US 10,307,971 B2
(45) Date of Patent: Jun. 4, 2019

(54) SUPPORT STRUCTURES DESIGN DEVICE AND METHOD, PROGRAM, STRUCTURE FORMING APPARATUS, AND STRUCTURE MANUFACTURING METHOD

(71) Applicant: FUJIFILM Corporation, Tokyo (JP)

(72) Inventor: Masafumi Sagawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 180 days.

(21) Appl. No.: 15/283,596

(22) Filed: Oct. 3, 2016

(65) Prior Publication Data

US 2017/0136709 A1 May 18, 2017

(30) Foreign Application Priority Data

Nov. 18, 2015 (JP) .................................. 2015-225489

(51) Int. Cl.
| | |
|---|---|
| B29C 67/00 | (2017.01) |
| B33Y 30/00 | (2015.01) |
| G09B 23/30 | (2006.01) |
| B33Y 50/00 | (2015.01) |
| B29C 64/386 | (2017.01) |
| B29C 64/40 | (2017.01) |
| B33Y 80/00 | (2015.01) |

(52) U.S. Cl.
CPC ........ *B29C 67/0092* (2013.01); *B29C 64/386* (2017.08); *B29C 64/40* (2017.08); *B33Y 30/00* (2014.12); *B33Y 50/00* (2014.12); *G09B 23/30* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 2009/0072447 A1 | 3/2009 | Hull et al. | |
| 2014/0048981 A1* | 2/2014 | Crump | B33Y 30/00 |
| | | | 264/401 |
| 2014/0316549 A1 | 10/2014 | Zenere | |
| 2015/0066178 A1* | 3/2015 | Stava | B29C 67/0088 |
| | | | 700/98 |

(Continued)

FOREIGN PATENT DOCUMENTS

| | | |
|---|---|---|
| JP | 9-169056 A | 6/1997 |
| JP | 2010-538882 A | 12/2010 |
| JP | 2014-533617 A | 12/2014 |

*Primary Examiner* — Suzanne Lo

(74) *Attorney, Agent, or Firm* — Birch, Stewart, Kolasch & Birch, LLP

(57) ABSTRACT

There are provided a support structures design device and method, a non-transitory computer readable recording medium storing a program, a structure forming apparatus, and a structure manufacturing method capable of appropriately adding the data of a support structures to the three-dimensional data of a luminal structure. The up-and-down direction of a luminal structure is determined, the core line of the luminal structure is extracted, a lowermost point of a cross section of the luminal structure by a plane perpendicular to a tangential direction at a point, which corresponds to each of a plurality of points on the core line, on a projected core line is extracted as a support point, and three-dimensional data is generated by adding the data of a support structures for supporting the support point to three-dimensional data.

20 Claims, 11 Drawing Sheets

(56) References Cited

U.S. PATENT DOCUMENTS

2015/0197063 A1\* 7/2015 Shinar .................... G06F 17/50
 700/98
2015/0269289 A1\* 9/2015 Kim ................... G06F 17/5009
 703/6

\* cited by examiner

SUPPORT STRUCTURES DESIGN DEVICE AND METHOD, PROGRAM, STRUCTURE FORMING APPARATUS, AND STRUCTURE MANUFACTURING METHOD

CROSS-REFERENCE TO RELATED APPLICATIONS

The present application claims priority under 35 U.S.C. § 119 to Japanese Patent Application No. 2015-225489, filed on Nov. 18, 2015. The above application(s) is hereby expressly incorporated by reference, in its entirety, into the present application.

BACKGROUND OF THE INVENTION

1. Field of the Invention

The present invention relates to a support structures design device and method, a non-transitory computer readable recording medium storing a program, a structure forming apparatus, and a structure manufacturing method, and in particular, a technique for modeling an object of a luminal structure using a three-dimensional printer.

2. Description of the Related Art

A three-dimensional printer that models a three-dimensional structure by laminating a composition material is known. Since a three-dimensional printer may not be able to laminate a composition material depending on the inclination angle of a structure to be modeled or the like, a support structures for supporting the composition material is required. JP2010-538882A, JP1997-169056A (JP-H09-169056A), and JP2014-533617A disclose a technique for designing a support structures.

SUMMARY OF THE INVENTION

In the medical field, modeling an organ based on medical image data, such as a three-dimensional computed tomography (CT) image, using a three-dimensional printer has been performed. The organ model is used for simulations of surgery or the like.

Within the organ, luminal structures having branches, such as lung blood vessels or bronchi, are present. In the related art, such a luminal structure has been modeled integrally with an object of the organ. In a case where the object of the luminal structure is modeled integrally with the object of the organ, it is not necessary to consider a support structures for supporting the object of the luminal structure since the object of the luminal structure is supported by the object of the organ.

On the other hand, there is demand for modeling of the object of a luminal structure alone for the purpose of reduction in costs or observation of the luminal structure alone. However, in the case of modeling a luminal structure by lamination, overhang portions are generated everywhere. For this reason, a support structures for supporting the overhang portions is essential.

However, in the techniques disclosed in JP2010-538882A, JP1997-169056A (JP-H09-169056A), and JP2014-533617A, modeling the object of the luminal structure alone has not been taken into consideration. Accordingly, there is a problem that the technique disclosed in JP2010-538882A, JP1997-169056A (JP-H09-169056A), and JP2014-533617A cannot be directly applied to the modeling of the object of a luminal structure.

The invention has been made in view of such a situation, and it is an object of the invention to provide a support structures design device and method, a non-transitory computer readable recording medium storing a program, a structure forming apparatus, and a structure manufacturing method capable of appropriately adding the data of a support structures to the three-dimensional data of a luminal structure.

In order to achieve the aforementioned object, according to an aspect of the invention, there is provided a support structures design device comprising: a data acquisition unit that acquires three-dimensional data of a luminal structure to be printed by lamination using a three-dimensional printer; an up-and-down direction determination unit that determines an up-and-down direction of the luminal structure in case of performing printing in the three-dimensional printer; a core line extraction unit that extracts a core line of the luminal structure; a support point extraction unit that extracts a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and a data generation unit that generates three-dimensional data by adding data of a support structures for supporting the support point to the three-dimensional data.

According to the aspect of the invention, the up-and-down direction of the luminal structure is determined, the core line of the luminal structure is extracted, the lowermost point of the cross section of the luminal structure by the plane perpendicular to the tangential direction at a point, which corresponds to each of the plurality of points on the core line, on the projected core line is extracted as a support point, and the three-dimensional data is generated by adding the data of the support structures for supporting the support point to the three-dimensional data. Therefore, it is possible to appropriately add the data of the support structures to the three-dimensional data of the luminal structure.

It is preferable that the support point extraction unit extracts the support point for points of all voxels on the core line. Therefore, it is possible to add the data of the support structures to a required location.

It is preferable to further comprise a determination unit that determines whether or not the support structures for the extracted support point is required based on an angle between the core line and the up-and-down direction. It is preferable that the data generation unit adds the data of the support structures to the support point for which it is determined that the support structures is required. Therefore, data of a useless support structures is not added.

It is preferable that, in a case where a minimum point other than the lowermost point is present on the cross section, the support point extraction unit extracts the minimum point as a support point. Therefore, it is possible to add the data of the support structures to a required location.

It is preferable that, in a case where a distance between the lowermost point and the minimum point is equal to or greater than a threshold distance, the support point extraction unit extracts the minimum point as the support point. Therefore, it is possible to add the data of the support structures only to a required minimum point.

In a case where a maximum point is present between the lowermost point and the minimum point, the support point extraction unit may extract the minimum point as the support point. Therefore, it is possible to add the data of the support structures only to a required minimum point.

It is preferable that the support structures is a member having a structure in which at least a part thereof is laminated in the up-and-down direction. Therefore, it is possible to appropriately support the support point in case of performing printing by lamination using a three-dimensional printer.

In order to achieve the aforementioned object, according to another aspect of the invention, there is provided a structure forming apparatus comprising: a support structures design device; a three-dimensional printer that performs printing by laminating a composition material based on generated three-dimensional data. The support structures design device comprises: a data acquisition unit that acquires three-dimensional data of a luminal structure to be printed by lamination using a three-dimensional printer; an up-and-down direction determination unit that determines an up-and-down direction of the luminal structure in case of performing printing in the three-dimensional printer; a core line extraction unit that extracts a core line of the luminal structure; a support point extraction unit that extracts a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and a data generation unit that generates three-dimensional data by adding data of a support structures for supporting the support point to the three-dimensional data.

According to the aspect of the invention, the up-and-down direction of the luminal structure is determined, the core line of the luminal structure is extracted, the lowermost point of the cross section of the luminal structure by the plane perpendicular to the tangential direction at a point, which corresponds to each of the plurality of points on the core line, on the projected core line is extracted as a support point, the three-dimensional data is generated by adding the data of the support structures for supporting the support point to the three-dimensional data, and printing is performed by laminating the composition material based on the generated three-dimensional data. Therefore, it is possible to print a luminal structure to which the support structures is appropriately added.

It is preferable that the three-dimensional printer prints the support structures and a structure corresponding to the luminal structure by laminating the same composition material. Therefore, it is not necessary to use an expensive composition material for a support structures, and it is possible to prevent the occurrence of positional deviation between the support structures and the luminal structure to be modeled.

In order to achieve the aforementioned object, according to still another aspect of the invention, there is provided a support structures design method comprising: a data acquisition step of acquiring three-dimensional data of a luminal structure to be printed by lamination using a three-dimensional printer; an up-and-down direction determination step of determining an up-and-down direction of the luminal structure in case of performing printing in the three-dimensional printer; a core line extraction step of extracting a core line of the luminal structure; a support point extraction step of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and a data generation step of generating three-dimensional data by adding data of a support structures for supporting the support point to the three-dimensional data.

According to the aspect of the invention, the up-and-down direction of the luminal structure is determined, the core line of the luminal structure is extracted, the lowermost point of the cross section of the luminal structure by the plane perpendicular to the tangential direction at a point, which corresponds to each of the plurality of points on the core line, on the projected core line is extracted as a support point, and the three-dimensional data is generated by adding the data of the support structures for supporting the support point to the three-dimensional data. Therefore, it is possible to appropriately add the data of the support structures to the three-dimensional data of the luminal structure.

In order to achieve the aforementioned object, according to still another aspect of the invention, there is provided a structure manufacturing method comprising: a data acquisition step of acquiring three-dimensional data of a luminal structure to be printed by lamination using a three-dimensional printer; an up-and-down direction determination step of determining an up-and-down direction of the luminal structure in case of performing printing in the three-dimensional printer; a core line extraction step of extracting a core line of the luminal structure; a support point extraction step of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; a data generation step of generating three-dimensional data by adding data of a support structures for supporting the support point to the three-dimensional data; and a printing step of performing printing by laminating a composition material based on the generated three-dimensional data.

According to the aspect of the invention, the up-and-down direction of the luminal structure is determined, the core line of the luminal structure is extracted, the lowermost point of the cross section of the luminal structure by the plane perpendicular to the tangential direction at a point, which corresponds to each of the plurality of points on the core line, on the projected core line is extracted as a support point, the three-dimensional data is generated by adding the data of the support structures for supporting the support point to the three-dimensional data, and printing is performed by laminating the composition material based on the generated three-dimensional data. Therefore, it is possible to print a luminal structure to which the support structures is appropriately added.

In order to achieve the aforementioned object, according to still another aspect of the invention, there is provided a non-transitory computer readable recording medium storing a program causing a computer to realize: a data acquisition function of acquiring three-dimensional data of a luminal structure to be printed by lamination using a three-dimensional printer; an up-and-down direction determination function of determining an up-and-down direction of the luminal structure in case of performing printing in the three-dimensional printer; a core line extraction function of extracting a core line of the luminal structure; a support point extraction function of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and a data generation function of generating three-dimensional data by adding data of a support structures for supporting the support point to the three-dimensional data.

A non-transitory computer readable recording medium storing a program causing a computer to execute a support structures design method is also included in this aspect.

According to the invention, it is possible to appropriately add the data of a support structures for three-dimensional printing to the three-dimensional data of a luminal structure.

DESCRIPTION OF THE PREFERRED EMBODIMENTS

Hereinafter, a preferred embodiment of the invention will be described with reference to the accompanying diagrams.

<Configuration of a Modeling Apparatus>

Figure 1:
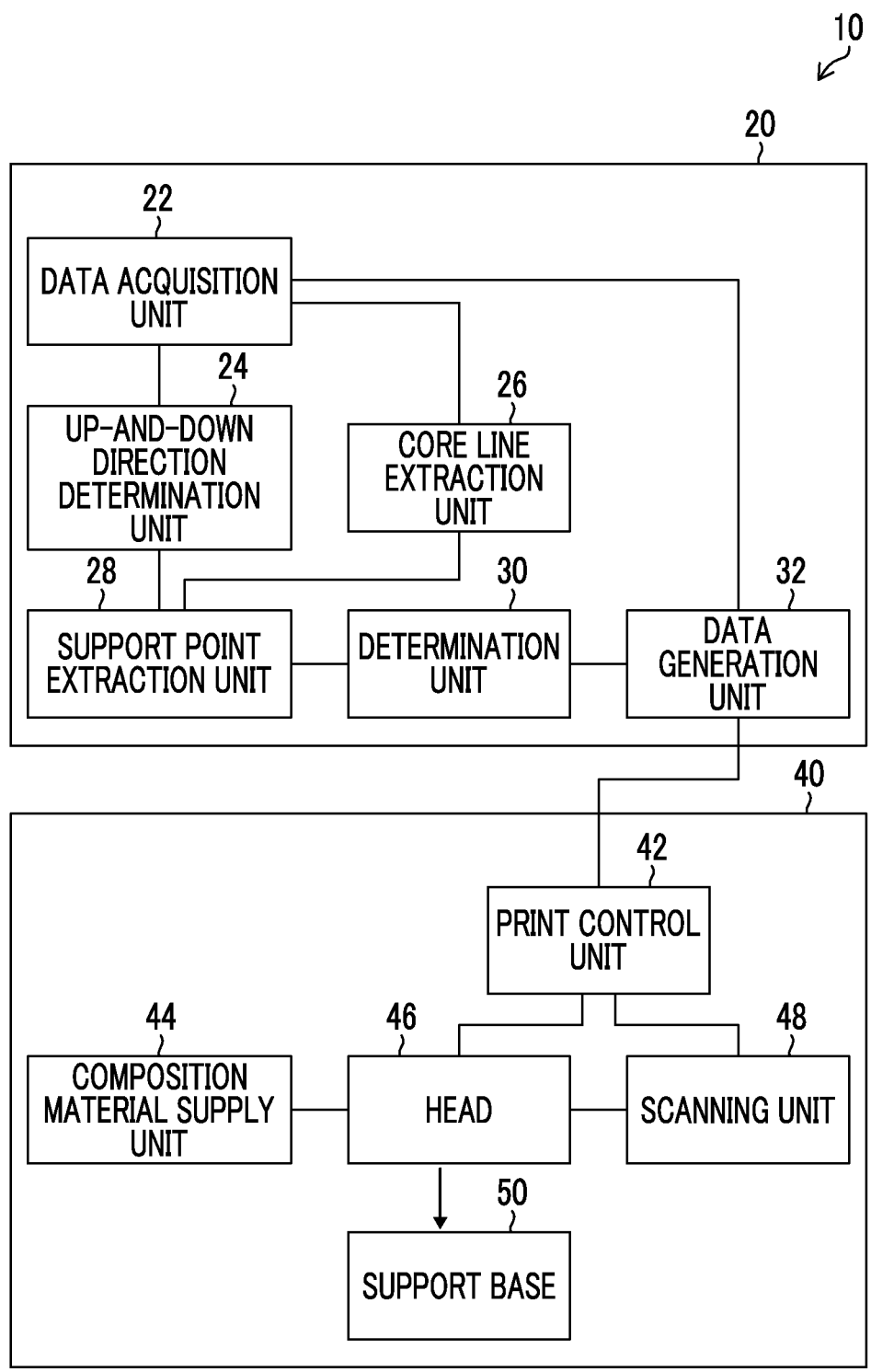
FIG. 1 is a block diagram showing an example of the configuration of a modeling apparatus.

FIG. 1 is a block diagram showing an example of the configuration of a modeling apparatus according to the present embodiment. A modeling apparatus 10 (an example of a structure forming apparatus) is an apparatus for modeling an object of a structure based on the three-dimensional digital data (three-dimensional data) of the structure. In particular, the modeling apparatus 10 models a luminal structure having a branch. As shown in FIG. 1, the modeling apparatus 10 is configured to include a support structures design device 20 and a three-dimensional (3D) printer 40.

The support structures design device 20 is a device for adding the data of a support structures having a support structure to acquired three-dimensional data, and comprises a data acquisition unit 22, an up-and-down direction determination unit 24, a core line extraction unit 26, a support point extraction unit 28, a determination unit 30, a data generation unit 32, and the like.

The data acquisition unit 22 (an example of a data acquisition unit) acquires the three-dimensional data of a structure through an input interface (not shown). In addition, three-dimensional data stored in advance in a memory (not shown), such as a read only memory (ROM), may be read and acquired. In the present embodiment, three-dimensional medical image data is acquired.

The up-and-down direction determination unit 24 (an example of an up-and-down direction determination unit) determines an up-and-down direction (projection direction) of the structure when printing (modeling) the three-dimensional data acquired by the data acquisition unit 22 in the 3D printer 40. The up-and-down direction can be a direction in which the center of gravity of the structure is the lowest, a direction in which the projection area of the structure is the smallest, a direction in which the sum of the lengths of the projected core lines (core line will be described later) of the structure is the smallest, and the like.

The core line extraction unit 26 (an example of a core line extraction unit) extracts a core line of a luminal structure based on the three-dimensional data. Here, the core line extraction unit 26 extracts a luminal structure included in the three-dimensional data and thins out the luminal structure, thereby extracting the core line of the luminal structure. The core line may also be extracted using other known methods.

The support point extraction unit 28 (an example of a support point extraction unit) extracts a support point for supporting an object of the luminal structure with a support structures based on the three-dimensional data of the luminal structure. In the present embodiment, for each of a plurality of points on the core line extracted by the core line extraction unit 26, the support point extraction unit 28 analyzes a cross section of the luminal structure by a plane perpendicular to a tangential direction at a point, which corresponds to each of the plurality of points on the core line, on a projected core line obtained by projecting the core line in the up-and-down direction, and extracts the lowest point or the minimum point of the cross section as a support point. The details of the method of extracting a support point will be described later.

The determination unit 30 (an example of a determination unit) determines whether or not a support structures is required for the support point extracted by the support point extraction unit 28. For example, the determination unit 30 determines whether or not a support structures is required based on the angle between the core line and the up-and-down direction.

The data generation unit 32 (an example of a data generation unit) generates three-dimensional data (object data) by adding the data of a support structures for supporting the support point to the three-dimensional data of the luminal structure.

On the other hand, the 3D printer 40 (an example of a three-dimensional printer) is a device for modeling the object of the structure by laminating a composition material based on the input three-dimensional data, and comprises a print control unit 42, a composition material supply unit 44, a head 46, a scanning unit 48, a support base 50, and the like.

The print control unit 42 performs overall control of the 3D printer 40. In the present embodiment, the object of the luminal structure is modeled based on the object data acquired from the data generation unit 32.

The composition material supply unit 44 is a supply unit that supplies a composition material for modeling the object of the structure to the head 46. The composition material is, for example, a filament-like acrylonitrile butadiene styrene (ABS) resin, and is wound on a reel (not shown).

The head 46 is a printing unit that laminates the composition material. The head 46 heats the composition material supplied from the composition material supply unit 44 to melt it, extrudes the molten composition material from a nozzle (not shown), and laminates it on the support base 50.

The scanning unit 48 is a scanning unit that scans the head 46 in X-axis and Y-axis directions, which are perpendicular to each other on the horizontal plane, and a Z-axis direction that is a vertical direction. The scanning unit 48 may scan the head 46 and the support base 50 relatively in the X-axis direction, the Y-axis direction, and the Z-axis direction. Alternatively, the scanning unit 48 may scan the head 46 in the X-axis direction and the Y-axis direction and scan the support base 50 in the Z-axis direction, or the scanning unit 48 may scan the head 46 in the X-axis direction and scan the support base 50 in the Y-axis direction and the Z-axis direction.

The support base 50 is a support unit having a support surface (not shown) in the horizontal direction. The composition material extruded from the nozzle of the head 46 is laminated on the support surface.

Here, a heat melting lamination method is used as a method of the 3D printer 40. However, it is possible to use known methods, such as an optical modeling method and an ink jet method.

<Method of Manufacturing a Structure>

Figure 2:
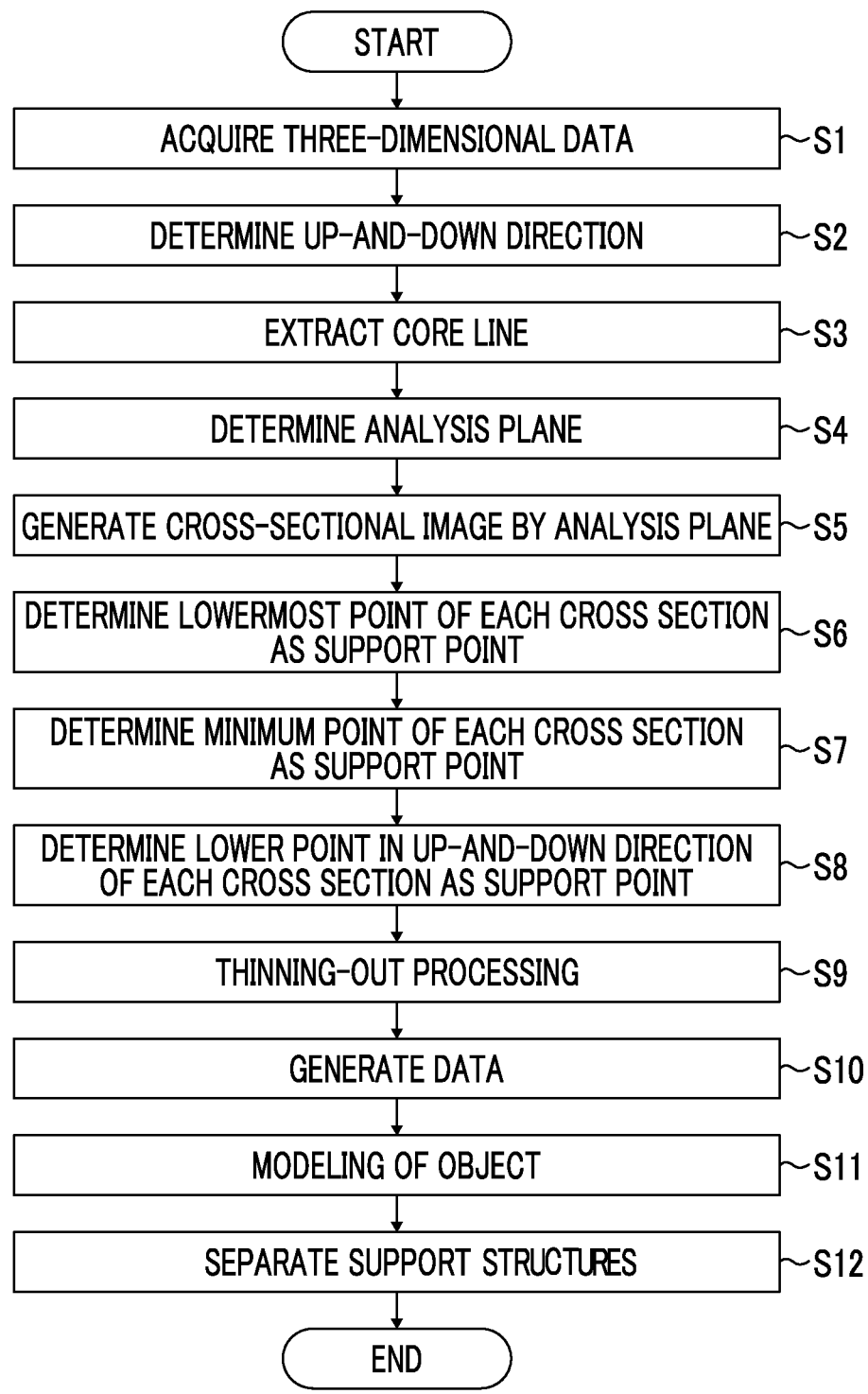
FIG. 2 is a flowchart showing an example of a structure manufacturing method.

Next, a method of manufacturing an object of a luminal structure using the modeling apparatus 10 will be described with reference to the flowchart shown in FIG. 2.

Figure 3:
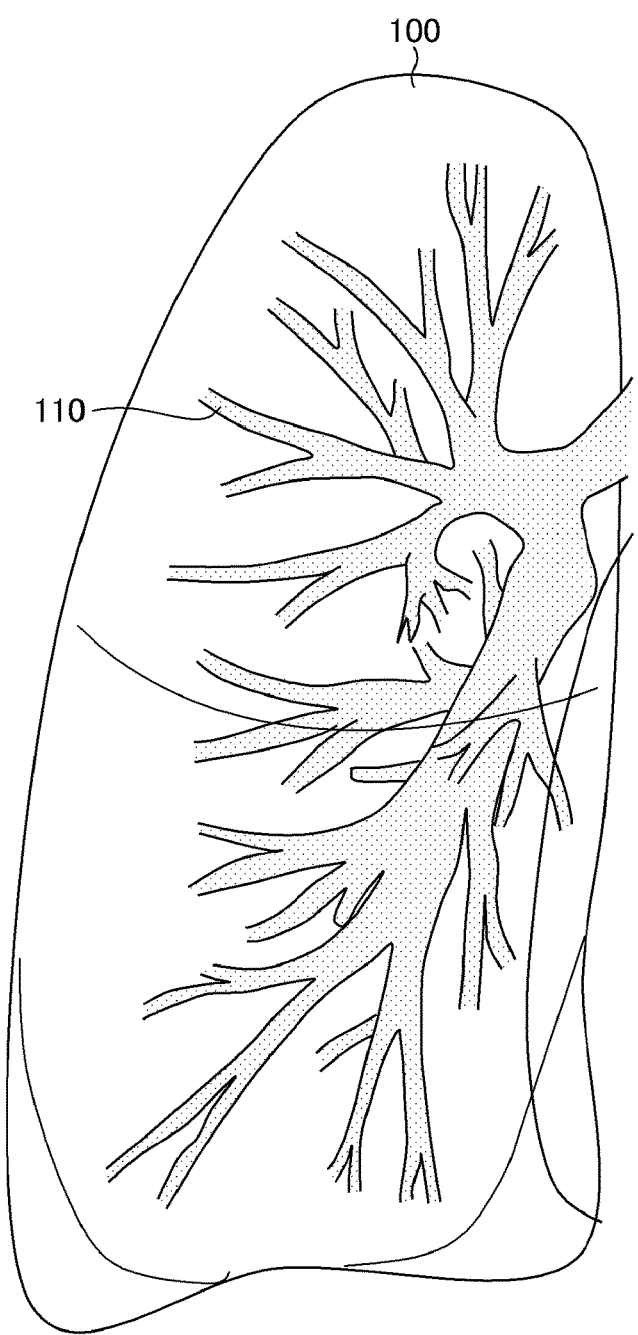
FIG. 3 is a diagram showing an example of three-dimensional medical image data.

First, the data acquisition unit 22 of the modeling apparatus 10 acquires three-dimensional data, and determines a structure whose object is to be modeled (step S1; an example of a data acquisition step). FIG. 3 is a diagram showing an example of three-dimensional medical image data, and shows data of a human lung 100 including a bronchus 110 herein. In the present embodiment, a structure whose object is to be modeled is assumed to be the bronchus 110 (an example of a luminal structure).

Figure 4:
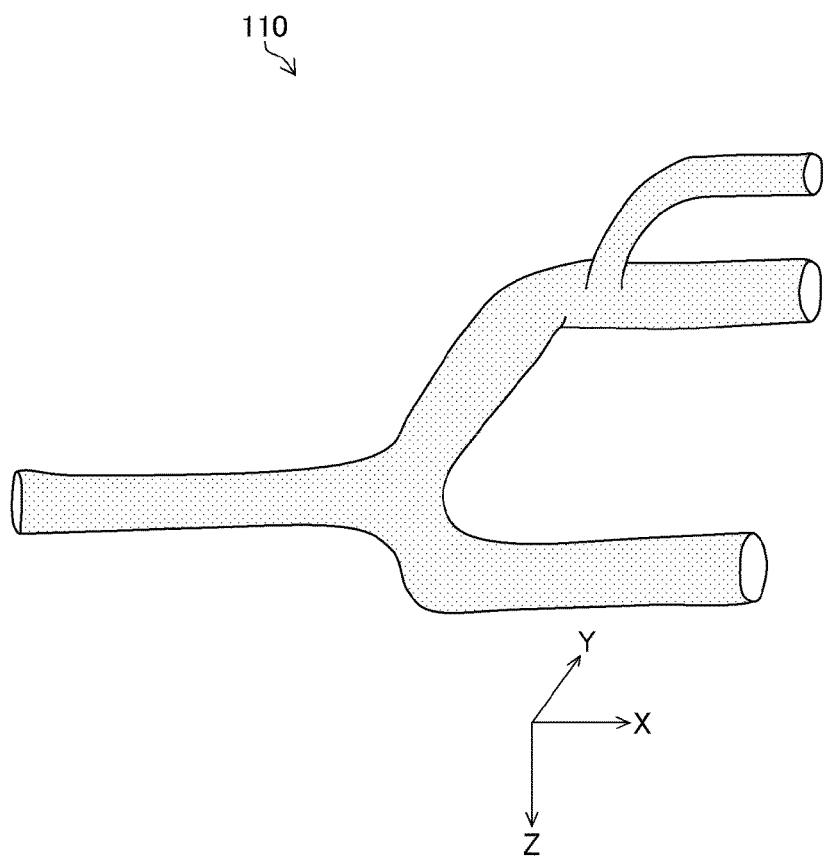
FIG. 4 is a diagram showing a part of the bronchus in a simplified manner.

Then, the up-and-down direction determination unit 24 acquires data of the luminal structure (here, the bronchus 110) whose object is to be modeled from the three-dimensional data, and determines an up-and-down direction (Z-axis direction) of the luminal structure when modeling an object in the 3D printer 40 (step S2; an example of an up-and-down direction determination step). FIG. 4 is a diagram showing a part of the bronchus 110 in a simplified manner, and the X-axis direction, the Y-axis direction, and the Z-axis direction are determined as directions shown in FIG. 4.

Figure 5:
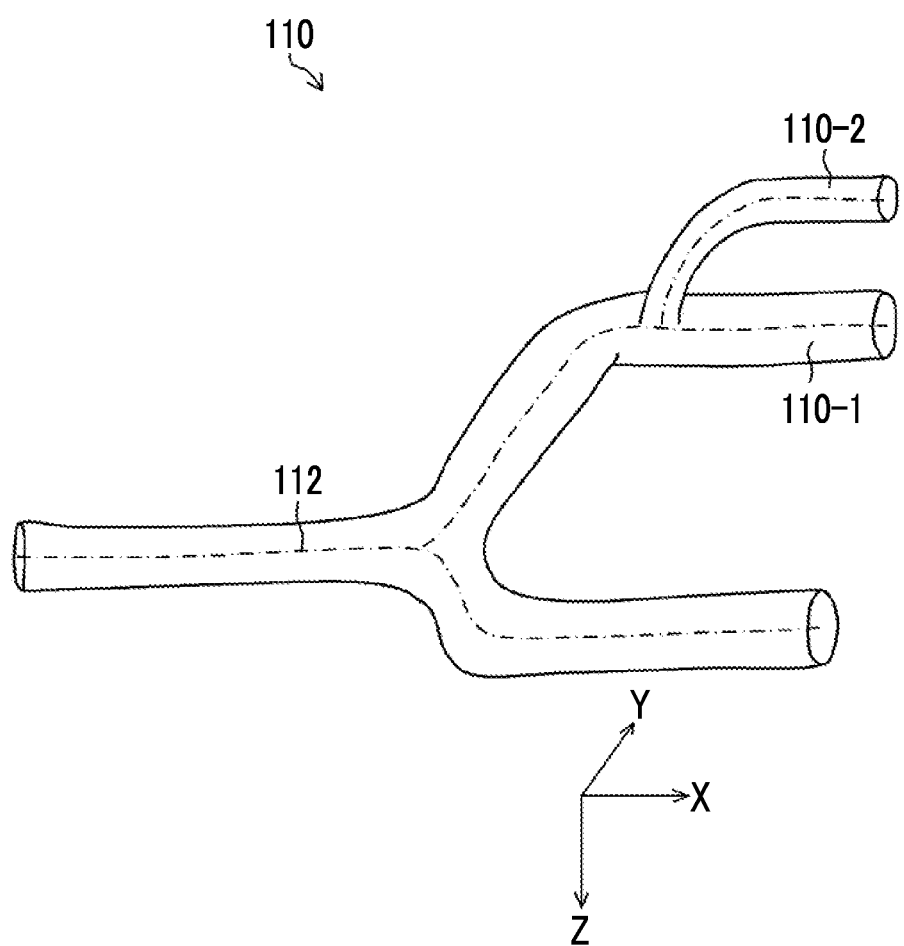
FIG. 5 is a diagram showing the core line extracted from the bronchus.

Then, the core line extraction unit 26 extracts a core line of the luminal structure whose object is to be modeled (step S3; an example of a core line extraction step). FIG. 5 is a diagram showing a core line 112 extracted from the bronchus 110 shown in FIG. 4 together with the bronchus 110.

Then, the support point extraction unit 28 determines an analysis plane for determining the support point of the object (step S4). Here, a projected core line 112*a* (refer to FIG. 6) is obtained by projecting all voxels, which form the core line 112, in the Z-axis direction (up-and-down direction), and a plane perpendicular to the tangential direction of the projected core line 112*a* at each point on the projected core line 112*a*, to which each voxel forming the core line 112 is projected, is assumed to be an analysis plane P corresponding to each voxel that forms the core line 112.

Figure 6:
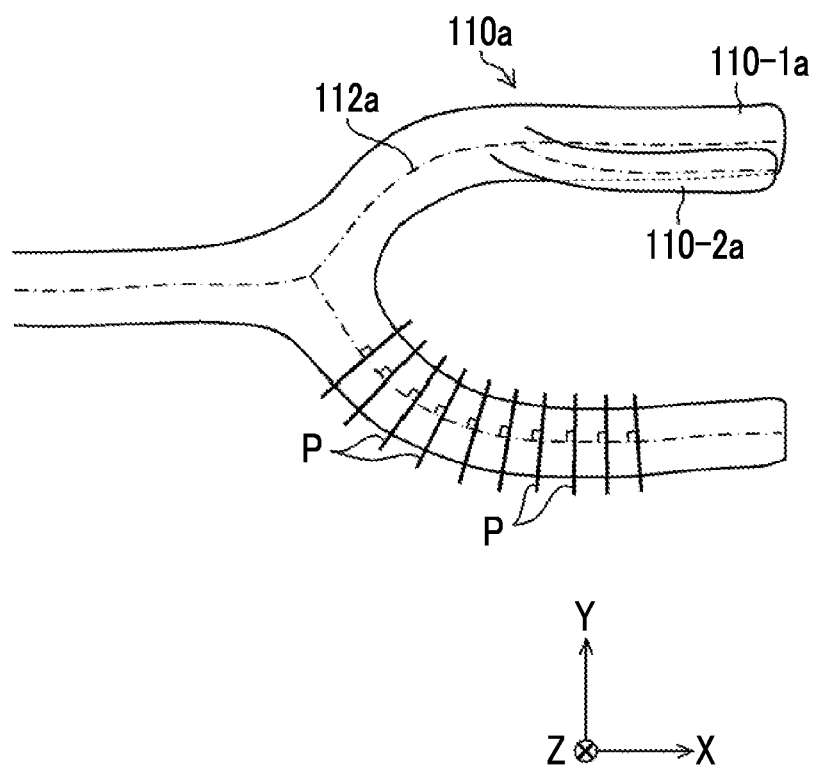
FIG. 6 is a diagram showing the projected bronchus and the projected core line.

FIG. 6 is a diagram showing a projected bronchus 110*a*, which is obtained by projecting the bronchus 110 shown in FIG. 5 in the Z-axis direction, and the projected core line 112*a*. In addition, some of the plurality of analysis planes P are shown in FIG. 6. As shown in FIG. 6, the analysis plane P is a plane parallel to the Z-axis direction, and is a plane perpendicular to the tangential direction of the projected core line 112*a*.

Figure 7:
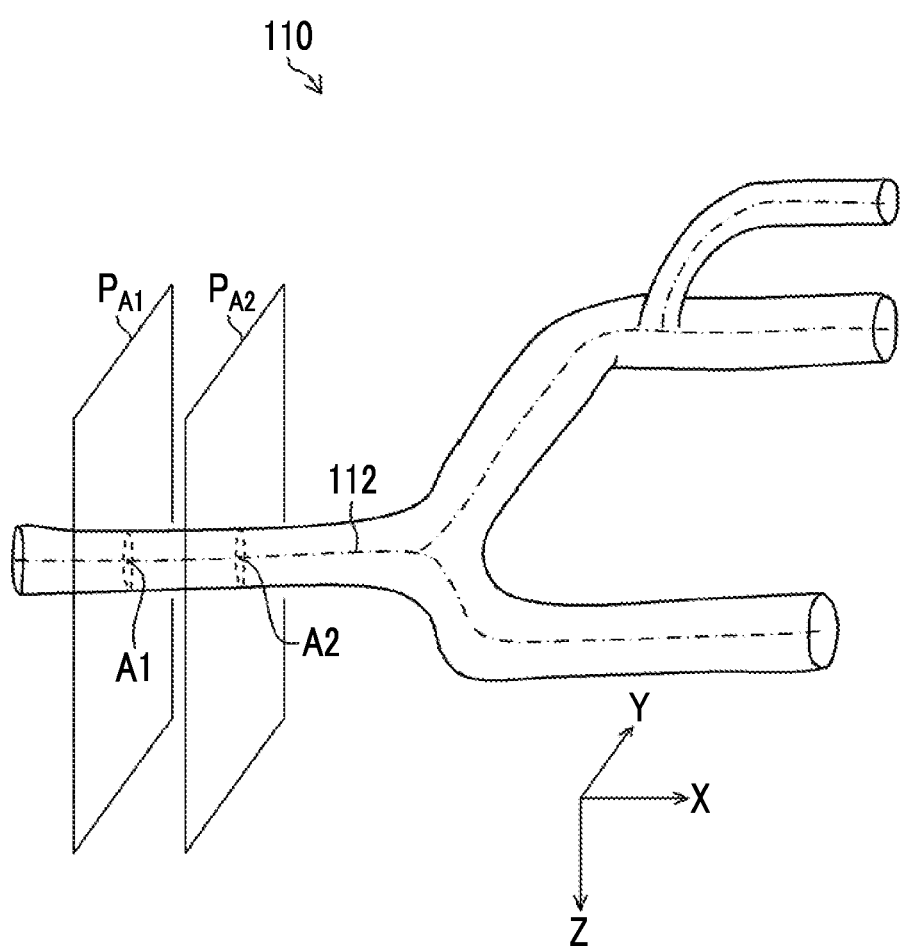
FIG. 7 is a diagram showing analysis planes.
Figure 8:
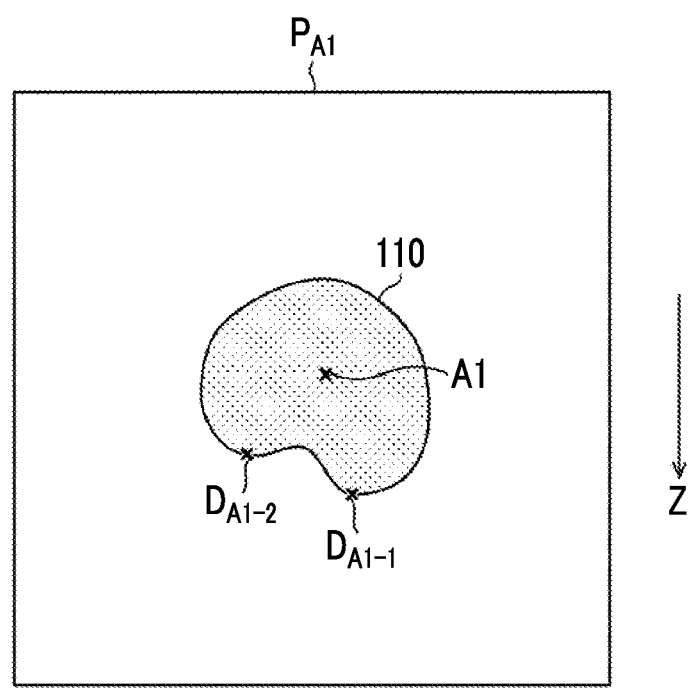
FIG. 8 is a diagram showing a cross-sectional image of the bronchus on the analysis plane.

Then, the support point extraction unit 28 generates a cross-sectional image of the luminal structure (bronchus 110) on each analysis plane P (step S5). FIG. 7 is a diagram showing analysis planes $P_{A1}$ and $P_{A2}$ for points A1 and A2 of voxels of the core line 112, and FIG. 8 is a diagram showing a cross-sectional image of the bronchus 110 on the analysis plane $P_{A1}$.

The support point extraction unit 28 determines a lowermost point, which is a point of a voxel of the surface of the luminal structure and which is the lowest point in the up-and-down direction (lowermost point in the vertical direction), in the cross-sectional image of the luminal structure on each analysis plane P, as a support point (step S6). Thus, a support point that is the lowermost point is determined for each analysis plane P in all voxels of the core line 112. In the example of the cross-sectional image shown in FIG. 8, a lowermost point $D_{A1-1}$ is extracted as a support point.

In addition, the support point extraction unit 28 also determines a minimum point, which is a point of a voxel of the surface of the luminal structure other than the lowermost point and which is the locally lowest point in the up-and-down direction among points which are in contact with the lower space in the up-and-down direction and at which the inclination of the tangent line of the surface of the luminal structure is zero, in the cross-sectional image of the luminal structure on each analysis plane P, as a support point (step S7). In the example of the cross-sectional image shown in FIG. 8, a minimum point $D_{A1-2}$ is extracted as a support point.

In addition, only in a case where the distance between the minimum point and the lowermost point $D_{A1-1}$ is equal to or greater than a threshold distance, the minimum point may be extracted as a support point. Alternatively, only in a case where a maximum point, which is a point of a voxel of the surface of the luminal structure and which is the locally highest point in the up-and-down direction among points which are in contact with the lower space in the up-and-down direction and at which the inclination of the tangent line of the surface of the luminal structure on each analysis plane P is zero, is present between the minimum point and the lowermost point $D_{A1-1}$, the minimum point may be extracted as a support point. In addition, only the minimum point satisfying the two conditions described above may be extracted as a support point.

Then, the support point extraction unit 28 determines a point, which is a point of a voxel of the surface of the luminal structure other than the lowermost point and the minimum point and which is in contact with the lower space in the up-and-down direction, in a cross-sectional image of the luminal structure on each analysis plane P as a support point (step S8). For example, voxels of the surface of the luminal structure are determined as support points at predetermined intervals in a predetermined range on each analysis plane using the support point (the lowermost point and the minimum point) determined in the above method as the center. In a case where it is determined that only supporting at the lowermost point $D_{A1-1}$ and the minimum point $D_{A1-2}$ is sufficient, it is not necessary to determine a new support point.

Then, the determination unit 30 performs thinning-out processing for the support points determined in steps S6 to S8 (step S9). The thinning-out processing is performed separately in a direction in which the core line 112 extends and the cross-sectional direction of the core line 112.

First, in a direction in which the core line 112 extends, in a case where the angle between the up-and-down direction and the tangential line at each voxel of the core line 112 is equal to or less than 45°, it is determined that a support structures is not required, and processing of thinning out the support point of the point of the voxel from all support points is performed. In addition, since a region where the angle between the up-and-down direction and the tangential line of the core line 112 is equal to or less than 45° continues, there is a possibility that an object will become unstable during the modeling if a region where the support structures has been thinned out exceeds a certain distance in a horizontal direction. Accordingly, in this case, a support structures may be added at every predetermined distance. That is, processing of thinning out no support point is performed at every predetermined distance.

Also in a case where the angle between the up-and-down direction and the tangential line at each voxel of the core line 112 is greater than 45°, processing of thinning out the support point in a predetermined range is performed. The range where a support point is thinned out can be determined according to a composition material or the like.

In addition, in the cross-sectional direction of the core line 112, in a case where the angle between the up-and-down direction and the tangential line of the surface of the luminal structure at each support point on each analysis plane P is equal to or less than 45°, it is determined that a support structures is not required, and processing of thinning out the support point from all support points is performed. Similar to the case of the extending direction of the core line 112, processing of thinning out no support point at every predetermined distance may be performed so that a region where the support structures has been thinned out does not exceed a certain distance in a horizontal direction.

The angle (here, 45°) of a threshold value in the support point thinning-out processing may be experimentally determined according to the composition material to be used. In addition, the thinning-out processing of the determination unit 30 can be omitted.

Then, the data generation unit 32 generates three-dimensional data by adding data of a support structures, which supports the support point determined by the support point extraction unit 28 and the determination unit 30, to the three-dimensional data acquired by the data acquisition unit 22 (step S10; an example of a data generation step). The data of the support structures may be data enabling the modeling of a support structures when modeling the object of the luminal structure in the print control unit 42. For example, three-dimensional data in which a luminal structure and a support structures are integrally formed may be generated, or three-dimensional data indicating the structure of a support structures and data of the position of a support point may be added to the header of the three-dimensional data acquired by the data acquisition unit 22. In addition, the data of the support structures may include information, such as a material or a color of the support structures.

In the present embodiment, steps S1 to S10 are a support structures design method.

The support structures that supports a support point is a member having a structure in which at least a part thereof is laminated in the up-and-down direction. For example, the support structures that supports a support point is a columnar member obtained by linearly extending a composition material upward in the up-and-down direction from the support base 50 to the support point. As a support structures, it is also possible to use a branch-like member that branches from a columnar member to extend obliquely upward. One support structures has a thickness that allows supporting a plurality of support points.

Here, the distance from the support base 50 to the support point (the length of the support structures in the up-and-down direction) is determined with the lowermost point having the lowest value (lowermost point having the lowest value in the vertical direction), among a plurality of lowermost points determined as support points by the support point extraction unit 28, as a reference.

The determination unit 30 may thin out the lowermost point having the lowest value in the up-and-down direction, among the lowermost points in all voxels of the core line 112 determined in step S6, from the support points. In this case, a point corresponding to the lowermost point having the lowest value in the object to be modeled is directly supported by the support base 50.

Then, the print control unit 42 controls the head 46 and the scanning unit 48 based on the object data input from the data generation unit 32 to model the object of the luminal structure by performing printing by laminating a composition material on the support base 50 (step S11; an example of a printing step).

Figure 9:
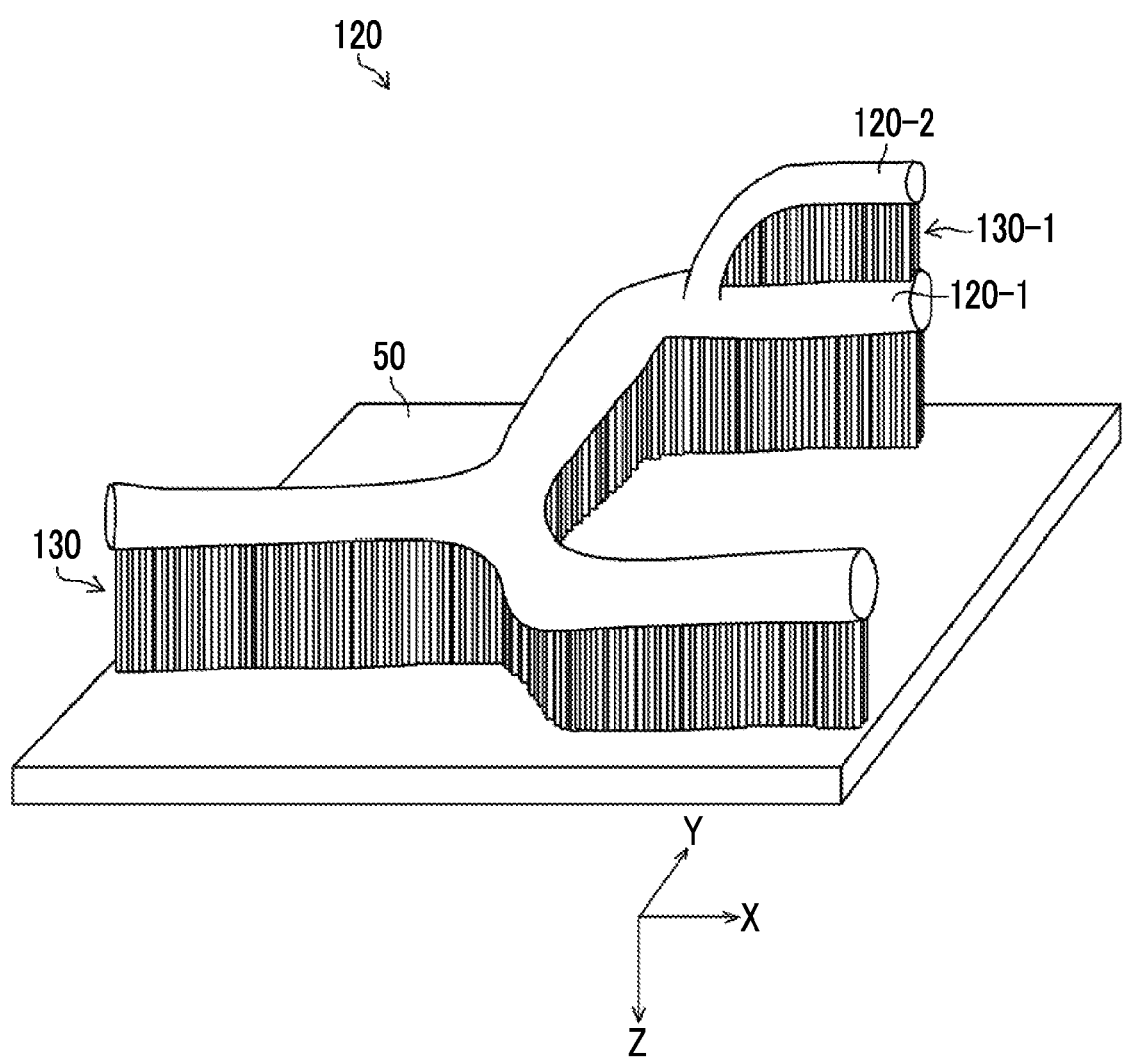
FIG. 9 is a diagram showing a bronchial object.

FIG. 9 is a diagram showing an object 120 of the bronchus modeled as described above. The object 120 of the bronchus modeled in the present embodiment is a full-scale object of the bronchus 110. When the cross section of the object 120 is approximated to an approximate circular shape, the diameter is about 20 mm or less. The external shape of the object 120 is based on three-dimensional data, but the object 120 does not have a luminal structure unlike the bronchus 110. The filling rate of the inside of the object 120 can be appropriately determined.

As shown in FIG. 9, the object 120 of the bronchus is supported by a support structures 130 on the support base 50. Since the support structures 130 is appropriately formed at a required location and is formed only for a support point for which it is determined that a support structures is required by the determination unit 30, a useless support structures is not formed. In addition, since a gap between the adjacent support structures 130 is formed by the processing of thinning out support points, it becomes easy to separate the adjacent support structures 130 from each other, which will be described later. Thus, according to the present embodiment, the support point is determined with a plane perpendicular to the tangential direction of the projected core line, which is obtained by extracting the core line of the luminal structure and projecting the core line in the up-and-down direction, as an analysis plane. Therefore, the object of the luminal structure can be appropriately supported by the support structures.

Figure 10A:
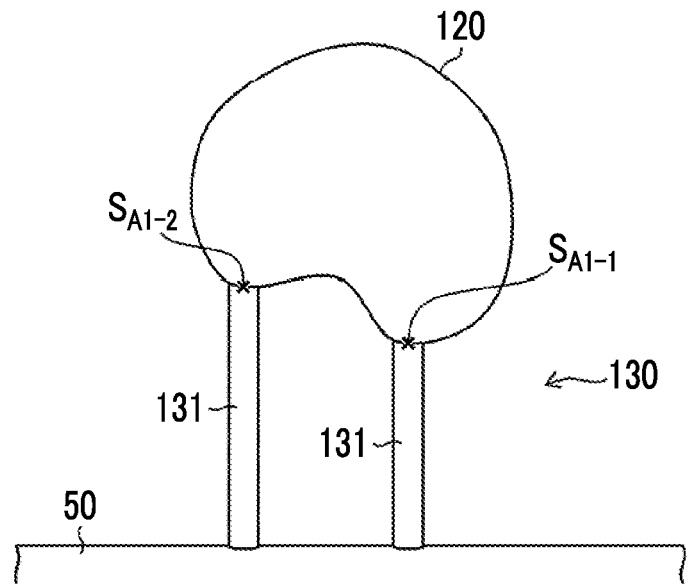
FIGS. 10A to 10C are cross-sectional views of an object and a support structures corresponding to the analysis plane shown in FIG. 8.
Figure 10B:
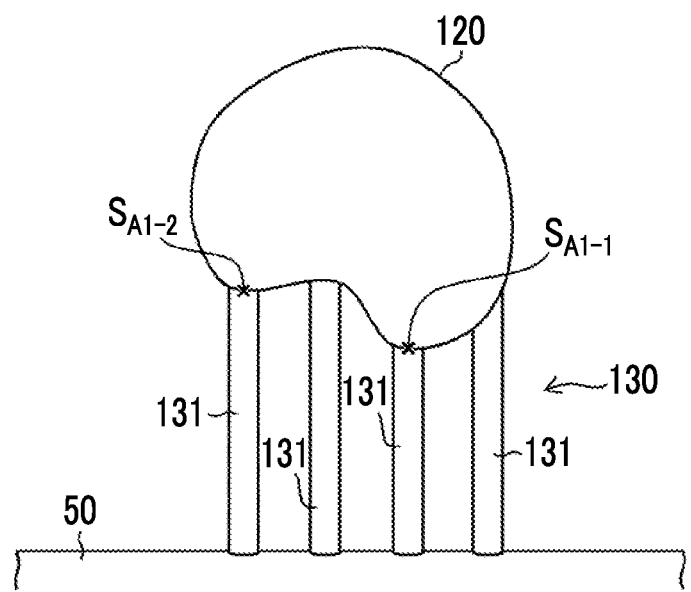
Figure 10C:
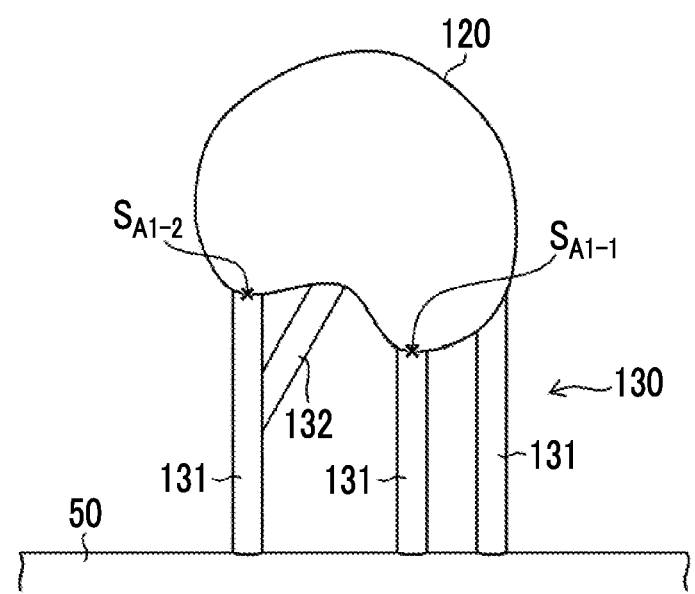

FIGS. 10A to 10C are cross-sectional views of the object 120 and the support structures 130 corresponding to the analysis plane $P_{A1}$ shown in FIG. 8. A support point $S_{A1-1}$ shown in FIGS. 10A to 10C is a support point corresponding to the lowermost point $D_{A1-1}$, and a support point $S_{A1-2}$ is a support point corresponding to the minimum point $D_{A1-2}$. In the example shown in FIG. 10A, each of the support points $S_{A1-1}$ and $S_{A1-2}$ is supported by a columnar member 131.

In the example shown in FIG. 10B, each of a plurality of support points at distant positions from the support points $S_{A1-1}$ and $S_{A1-2}$ is supported by the columnar member 131. Support points other than the support points $S_{A1-1}$ and $S_{A1-2}$ are support points determined by the processing in step S8.

In the example shown in FIG. 10C, respective support points including the support points $S_{A1-1}$ and $S_{A1-2}$ are supported using the columnar member 131 and a branch-like member 132. Thus, the data generation unit 32 may add either the data of the columnar member 131 or the data of the branch-like member 132 as data of the support structures. The branch-like member 132 is formed such that the angle of the branch-like member 132 with respect to the up-and-down direction is equal to or less than 45°. Thus, it may be possible to reduce the amount of a composition material, which is used as a support structures, by using the branch-like member 132.

In a case where the luminal structure is branched, the above-described processing is performed for each branched luminal structure. As a result, in a case where other luminal structures are present below the support point in the up-and-down direction determined by the support point extraction unit 28 and the determination unit 30, a support structures is formed between objects.

For example, in bronchi 110-1 and 110-2 shown in FIG. 5, as shown in FIG. 6, a projected bronchus 110-1a of the bronchus 110-1 and a projected bronchus 110-2a of the bronchus 110-2 have an overlap in the up-and-down direction. In a case where the bronchus 110-1 is present below the support point of the bronchus 110-2 in the up-and-down direction, a support structures 130-1 that supports an object 120-2 corresponding to the bronchus 110-2 is laminated from an object 120-1 corresponding to the bronchus 110-1 to the object 120-2 as shown in FIG. 9.

In the present embodiment, the object 120 of the bronchus and the support structures 130 are laminated and modeled using the same composition material. However, the object 120 of the bronchus and the support structures 130 may be modeled in different composition materials using a plurality of heads 46 for laminating different composition materials.

Finally, the support structures 130 is separated from the object 120 of the bronchus, so that the object 120 is in a single body state (step S12). Since the support structures 130 is formed only for a support point for which it is determined that a support structures is required by the determination unit 30, the work of separating the support structures 130 can be performed with the minimum effort and time. By separating the support structures 130 as described above, it is possible to observe the finished object 120 of the bronchus alone.

In the present embodiment, processing is performed with a sampled voxel of three-dimensional digital data as a reference unit. However, the invention is not limited thereto. That is, in the present embodiment described above, processing is performed using sampled discrete voxels. However, the processing may be performed for a continuous structure. Therefore, for example, it is also possible to determine the position of a support point in sub-voxel units and perform modeling and outputting.

The support structures design method or the structure manufacturing method may be configured as a non-transitory computer readable recording medium storing a program causing a computer to realize a data acquisition function, an up-and-down direction determination function, a core line extraction function, a support point extraction function, a data generation function, and a printing function for executing a data acquisition step, an up-and-down direction determination step, a core line extraction step, a support point extraction step, a data generation step, and a printing step, or may be configured as a non-transitory recording medium, such as a compact disk-read only memory (CD-ROM) in which the non-transitory computer readable recording medium storing a program is stored.

The technical scope of the invention is not limited to the range described in the above embodiment. The configurations and the like in the embodiment can be appropriately combined without departing from the spirit and scope of the invention.

What is claimed is:
1. A support structures design device, comprising:
 a computer processor configured to:
  acquire three-dimensional data of a luminal structure of a human organ to be printed by lamination using a three-dimensional printer;
  determine an up-and-down direction of the luminal structure in case of performing printing in the three-dimensional printer;
  extract a luminal structure included in the three-dimensional data and thin out the luminal structure to extract a core line of the luminal structure;
  extract a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and
  generate three-dimensional data by adding data of a support structures for supporting the support point to the three-dimensional data.

2. The support structures design device according to claim 1,
 wherein the computer processor extracts the support point for points of all voxels on the core line.

3. The support structures design device according to claim 1, the computer processor further configured to:
 determine whether or not the support structures for the extracted support point is required based on an angle between the core line and the up-and-down direction,
 wherein the computer processor adds the data of the support structures for the support point for which it is determined that the support structures is required.

4. The support structures design device according to claim 2, the computer processor further configured to:
 determine whether or not the support structures for the extracted support point is required based on an angle between the core line and the up-and-down direction,
 wherein the computer processor adds the data of the support structures for the support point for which it is determined that the support structures is required.

5. The support structures design device according to claim 1,
 wherein, in a case where a minimum point other than the lowermost point is present on the cross section, the computer processor extracts the minimum point as a support point.

6. The support structures design device according to claim 2,
 wherein, in a case where a minimum point other than the lowermost point is present on the cross section, the computer processor extracts the minimum point as a support point.

7. The support structures design device according to claim 3,
 wherein, in a case where a minimum point other than the lowermost point is present on the cross section, the computer processor extracts the minimum point as a support point.

8. The support structures design device according to claim 4,
 wherein, in a case where a minimum point other than the lowermost point is present on the cross section, the computer processor extracts the minimum point as a support point.

9. The support structures design device according to claim 5,
 wherein, in a case where a distance between the lowermost point and the minimum point is equal to or greater than a threshold distance, the computer processor extracts the minimum point as the support point.

10. The support structures design device according to claim 6,
wherein, in a case where a distance between the lowermost point and the minimum point is equal to or greater than a threshold distance, the computer processor extracts the minimum point as the support point.

11. The support structures design device according to claim 7,
wherein, in a case where a distance between the lowermost point and the minimum point is equal to or greater than a threshold distance, the computer processor extracts the minimum point as the support point.

12. The support structures design device according to claim 8,
wherein, in a case where a distance between the lowermost point and the minimum point is equal to or greater than a threshold distance, the computer processor extracts the minimum point as the support point.

13. The support structures design device according to claim 5,
wherein, in a case where a maximum point is present between the lowermost point and the minimum point, the computer processor extracts the minimum point as the support point.

14. The support structures design device according to claim 9,
wherein, in a case where a maximum point is present between the lowermost point and the minimum point, the computer processor extracts the minimum point as the support point.

15. The support structures design device according to claim 1,
wherein the support structures is a member having a structure in which at least a part thereof is laminated in the up-and-down direction.

16. A structure forming apparatus, comprising:
a computer processor configured to:
acquire three-dimensional data of a luminal structure to be printed by lamination using a three-dimensional printer;
determine an up-and-down direction of the luminal structure in case of performing printing in the three-dimensional printer;
extract a luminal structure included in the three-dimensional data and thin out the luminal structure to extract a core line of the luminal structure;
extract a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and
generate three-dimensional data by adding data of a support structures for supporting the support point to the three-dimensional data; and
a three-dimensional printer that performs printing by laminating a composition material based on the generated three-dimensional data.

17. The structure forming apparatus according to claim 16,
wherein the three-dimensional printer prints the support structures and a structure corresponding to the luminal structure by laminating the same composition material.

18. A support structures design method, comprising:
a data acquisition step of acquiring three-dimensional data of a luminal structure to be printed by lamination using a three-dimensional printer;
an up-and-down direction determination step of determining an up-and-down direction of the luminal structure in case of performing printing in the three-dimensional printer;
a core line extraction step of extracting a luminal structure included in the three-dimensional data and thin out the luminal structure to extract a core line of the luminal structure;
a support point extraction step of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and
a data generation step of generating three-dimensional data by adding data of a support structures for supporting the support point to the three-dimensional data.

19. A structure manufacturing method, comprising:
a data acquisition step of acquiring three-dimensional data of a luminal structure to be printed by lamination using a three-dimensional printer;
an up-and-down direction determination step of determining an up-and-down direction of the luminal structure in case of performing printing in the three-dimensional printer;
a core line extraction step of extracting a luminal structure included in the three-dimensional data and thin out the luminal structure to extract a core line of the luminal structure;
a support point extraction step of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line;
a data generation step of generating three-dimensional data by adding data of a support structures for supporting the support point to the three-dimensional data; and
a printing step of performing printing by laminating a composition material based on the generated three-dimensional data.

20. A non-transitory computer readable recording medium storing a program causing a computer to realize:
a data acquisition function of acquiring three-dimensional data of a luminal structure to be printed by lamination using a three-dimensional printer;
an up-and-down direction determination function of determining an up-and-down direction of the luminal structure in case of performing printing in the three-dimensional printer;
a core line extraction function of extracting a luminal structure included in the three-dimensional data and thin out the luminal structure to extract a core line of the luminal structure;
a support point extraction function of extracting a lowermost point of a cross section of the luminal structure by a plane perpendicular to a tangential direction at a point, which corresponds to each of a plurality of points on the core line, on a projected core line obtained by projecting the core line in the up-and-down direction, as a support point, for each of the plurality of points on the core line; and a data generation function of generating three-dimensional data by adding data of a support structures for supporting the support point to the three-dimensional data.

* * * * *